May 26, 1970    B. T. NOBLE    3,513,935

AIR CUSHION SUPPORTED PLATFORMS

Filed May 10, 1968

United States Patent Office 3,513,935
Patented May 26, 1970

3,513,935
AIR CUSHION SUPPORTED PLATFORMS
Bruce Thomas Noble, Yeovil, Somerset, England, assignor to British Hovercraft Corporation Limited, Yeovil, Somerset, England
Filed May 10, 1968, Ser. No. 728,130
Claims priority, application Great Britain, June 1, 1967, 25,459/67
Int. Cl. B60v 1/04, 1/16
U.S. Cl. 180—124                            7 Claims

ABSTRACT OF THE DISCLOSURE

A load carrying pallet has a load bearing platform fitted with a number of wheels or casters and at least one air cushion pad. When the platform is not air cushion supported the wheels or casters facilitate movement of the platform and maintain the platform clear of the ground. The air cushion pad comprises a flexible diaphragm secured to the underside of the platform and arranged to be inflated from a supply of pressurized air to assume an extended operational position to lift the feet or casters clear of the ground and to form at least part of the boundary of a supporting air cushion. The diaphragm is biased toward the underside of the platform so that in the unpressurized condition the diaphragm automatically assumes a convoluted configuration in a retracted position adjacent the underside of the platform and is maintained in this position to be clear of the ground when the platform is resting on the wheels or casters.

---

Figure 1:
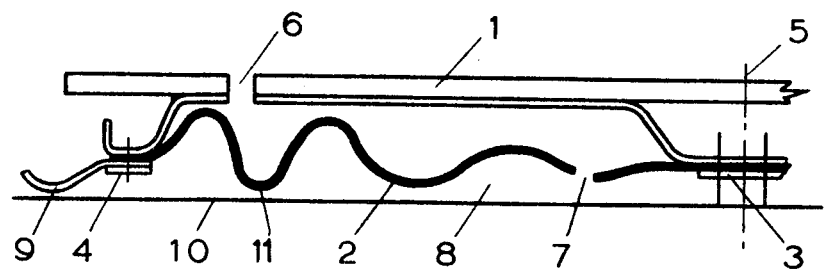

This invention relates to ground effect machines, and more particularly to load carying pallets being supported on one or more independent air cushion pads.

Industrial load carrying pallets have long been in use which use wheels or castors for support. More recently, the use of air cushion pads for the support of such load pallets has been proposed, and such load pallets are often known by the term "Hoverpallet." An air cushion supported load pallet usually consists of a load bearing platform, below which are one or more flexible diaphragms. The inflation of the space between each diaphragm and the platform with pressurised air gives lift to the platform, and causes the diaphragm to assume a shape to act as a boundary to the air cushion pad. Additionally, the platform may be provided with a flexible skirt which usually depends from the periphery of the platform. The term "air cushion supported" is meant to include other gases and fluids.

When air cushion supported load pallet diaphragms are not inflated, they hang loosely beneath the load bearing platform, and as the clearance between the platform is less when the pallet is resting on its feet than when it is air cushion supported, the diaphragms rub on the ground, wear, crease, and make movement of the pallet difficult. Further, when first pressurised for a lifting operation, a creased diaphragm may allow air to escape from the air cushion pad, making initial air cushion support difficult.

It is an object of the invention to provide load carrying pallets in which creasing of the diaphragms when they are not inflated and the drag produced by uninflated diaphragms rubbing on the ground is considerably reduced.

According to the invention I provide a load carrying pallet including a load bearing platform which, in operation, is supported on at least one cushion of pressurised fluid formed beneath the platform, said cushion or cushions being bounded at least in part by a flexible diaphragm, said diaphragm being biased toward said plaform to assume a retracted position clear of the ground, and being arranged to be extended away from said platform by application of pressurised fluid to assume an operational position, and to revert to its retracted position when deflated.

The diaphragm may be of flexible impermeable material, and if desired may be formed with inherent elasticity.

If desired, the diaphragm may be preformed or moulded to any desired shape, such that it will revert to its preformed or moulded shape when deflated. One such diaphragm may be formed with a plurality of surface convolutions.

Alternatively, the diaphragm may be connected to rigid structure by elastic cords which bias the diaphragm to assume a retracted position when deflated.

If desired, the diaphragm may be provided with a downwardly extending projection at its lowermost region at least when inflated.

Such a projection may be either moulded integrally with the diaphragm, or may be inherent in the preformed shape, or may be in the form of an extrusion suitably attached to the diaphragm.

If desired, a skirt may be provided around the periphery of the platform, around the periphery of each diaphragm, or on the underside of the platform, so as to encompass the diaphragms.

The pallet may be provided with wheels or castors to provide additional support, or to support the pallet when it is not cushion supported.

Figure 2:
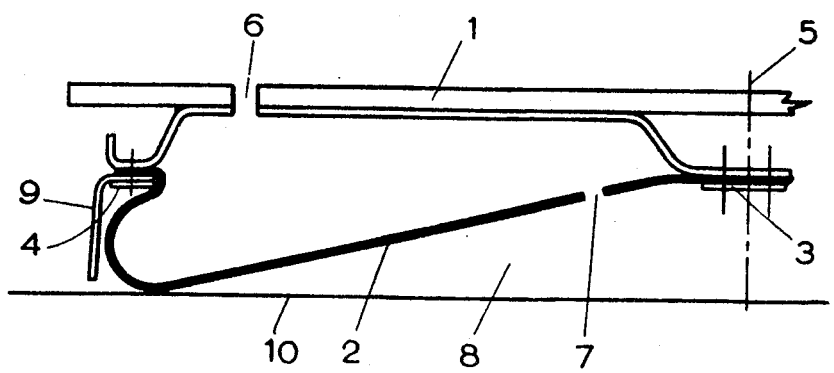
Figure 3:
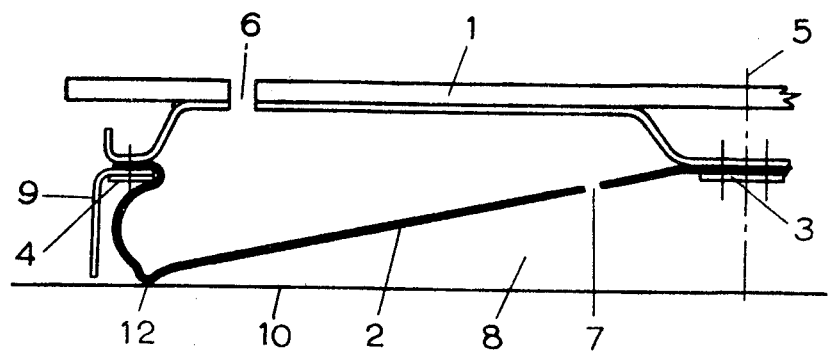
Figure 4:
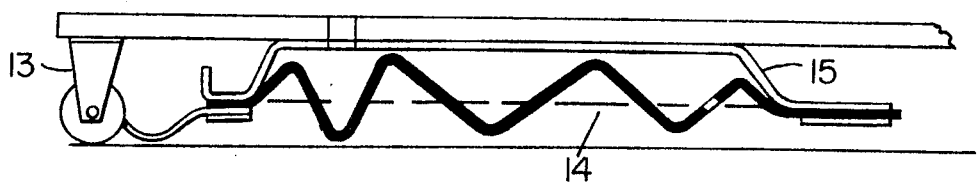

The invention will now be described, by way of example, with reference to the accompanying drawings, in which:

FIG. 1 is a section of part of the platform and diaphragm of a load carrying pallet according to the prefered embodiment of the invention showing part of a diaphragm of flexible impermeable material in its retracted shape, FIG. 2 is the part of the platform and diaphragm, as illustrated in FIG. 1, showing the part of the diaphragm in its operating configuration, FIG. 3 shows the same part of the platform and diaphragm as FIG. 2 in an operating configuration in another embodiment of the invention, and FIG. 4 is a view generally according to FIG. 1, but showing additional details.

A platform 1 has a diaphragm 2 attached to its underside by airtight joints at points 3 and 4 of a rigid inverted dished plate 15 secured to the underside of the platform. It is to be understood that only one half of an air cushion pad is illustrated in the drawings, and that the diaphragm 2 is symmetrical about a centre line 5, thus the securing point 3 is at the centre of the diaphragm, and the securing point 4 is at the periphery of the diaphragm.

The diaphragm is made from any suitable flexible impermeable material, for example, natural rubber, neoprene or polyurethane, and is moulded to a convoluted shape with the convolutions concentric, with the central fixing point 3, as illustrated in FIG. 1.

Air at superatmospheric pressure is supplied to the space between the diaphragm 2 and the platform 1 by way of an orifice 6. An orifice 7 in the diaphragm 2 provides a passage for the superatmospheric pressure air to the air cushion area 8. The supply of air at superatmospheric pressure to the orifice 6 in the platform 1 is selectively controlled by a cock (not shown).

A flexible skirt 9 depends from the periphery of the diaphragm 2.

When the air supply is shut off the platform 1 rests upon castors (one of which is shown at 13 in FIG. 4) above a ground line 10 (FIG. 1). In this condition, the air on each side of the diaphragm 2 is at atmospheric pressure, and the diaphragm 2 assumes its moulded convoluted shape with its convolutions substantially equally spaced above and below a straight line 14 (FIG. 4) joining the central securing point 3 and the periphery securing point 4, and it is clear of the ground. The peaks of the convolutions extend toward the platform 1, and hence divide the space between the diaphragm and the platform into a plurality of annular concentric air spaces.

Elastic cords (not shown) may be used to ensure retraction, when the material of the diaphragm is insufficiently stiff for it to assume its convoluted shape by itself.

When superatmospheric pressure air is fed to the space between the diaphragm and the underside of the platform the diaphragm expands and raises the platform. The air also flows through the orifices 7 in the diaphragm, to form an air cushion in the space 8 below the diaphragm to support the platform. In this condition the diaphragm is acted upon by the superatmospheric pressure air on one side and the cushion pressure air on the other side, and assumes its operating configuration (FIG. 2) with a small clearance above a ground line 10.

In the modified form of diaphragm shown in FIG. 3, the outer part is stiffened so that it resists the inflatory pressure of the superatmospheric pressure air, and provides a lip 12, having a smaller radius than the natural radius of the curve at the lateral edge of the diaphragm. This smaller radius gives a sharper, and, therefore, a more efficient, lateral barrier to the air cushion, and initiates retractive movement on deflation. In normal operation the inherent bias provided by the diaphragm being molded with a convoluted surface is sufficient to facilitate automatic retraction of the diaphragm when unpressurized. However, the optional lip 12 assists in initiating correct retraction in two ways. Firstly, upon deflation of the diaphragm the walls of the lip will draw together, tending to shorten slightly the distance between the inner and outer attachment points and move the diaphragm upwardly, and secondly the lip can initiate retraction by providing a positive point contact with the ground as the platform descends upon cessation of the air supply.

The lip 12 is shown as an integrally moulded part, but it may be formed as a separate extrusion and be suitably attached to the diaphragm surface.

Although various embodiments are described herein and illustrated in the drawings, the invention is not to be considered as limited thereto, and modifications can be made which are within its scope. For example, the load pallet may be provided with handles for manual movement. The air or gas supply may be from a remote source or integral with the machine. Suitable air or gas supply controls may be foot or hand operated. The machine may with advantage be used in conjunction with fork lift type trucks, when its dimensions would be regulated by the width of the lift forks. The platform may be supported by a plurality of air cushions, each cushion being defined by a diaphragm.

I claim as my invention:

1. A load carrying pallet which during operation receives support from at least one cushion of pressurized air, the pallet comprising a load-bearing platform, support members depending from the platform for supporting the platform clear of the supporting surface when the platform is not air cushion supported, a flexible diaphragm secured to the platform and located adjacent the underside thereof for, when inflated, assuming an extended pressurized condition to lift the platform and its support members clear of the supporting surface and for forming at least part of the boundary of a supporting cushion of air beneath said platform, said diaphragm having a surface portion generally confronting the supporting surface, said diaphragm being formed in said surface portion with a plurality of convolutions in its unpressurized state and tendency biased to return to the convoluted state when unpressurized so that in the unpressurized condition the diaphragm is biased toward the underside of the platform and automatically maintained in a retracted position clear of the supporting surface when the platform is resting on said support members.

2. Apparatus as claimed in claim 1 wherein said support members comprise a plurality of casters.

3. A load carrying pallet as claimed in claim 1 wherein said diaphragm is connected to said platform at a radially inner position and a radially outer position and said surface portion being between said inner and outer positions, said surface portion, viewed normal to its radius in cross-section, being convoluted in the retracted position when unpressurized, the peaks of the convolutions extending toward said platform so as to form a plurality of air spaces between the convoluted diaphragm and said platform spaced apart by the peaks of the convolutions, and being substantially unconvoluted in the extended pressurized state to form a single substantially uninterrupted air space.

4. A load carrying pallet as claimed in claim 3 wherein said diaphragm viewed generally normal to said platform is of annular configuration about said inner position of attachment, whereby said single air space is of annular configuration and said plurality of air spaces are concentrically disposed about said inner position of attachment.

5. A load carrying pallet as claimed in claim 3 wherein the diaphragm is secured at its center and peripheral regions to a rigid inverted dished plate, the plate being secured to the underside of the platform.

6. Apparatus as claimed in claim 1 further comprising a projection on the lowermost region of the diaphragm when pressurized for initiating retraction during the pressurization.

7. Apparatus as claimed in claim 6 wherein said projection comprises a downwardly convex convolution of small radius relative to the natural curvature of the pressurized diaphragm in the area of the projection.

References Cited
UNITED STATES PATENTS

| | | | |
|---|---|---|---|
| 3,244,244 | 4/1966 | Cockerell | 180—128 |
| 3,247,921 | 4/1966 | Latimer-Needham et al. | 180—124 |
| 3,276,222 | 10/1966 | Hutchinson | 180—125 X |
| 3,289,778 | 12/1966 | Page et al. | 180—128 |
| 3,346,063 | 10/1967 | Bertin | 180—121 |
| 3,373,839 | 3/1968 | Hardy et al. | 180—128 |
| 3,414,076 | 12/1968 | Bertin et al. | 180—124 |
| 3,390,736 | 7/1968 | Thomas | 180—119 |

A. HARRY LEVY, Primary Examiner

U.S. Cl. X.R.

180—128